(12) United States Patent
Slimacek et al.

(10) Patent No.: US 11,248,819 B2
(45) Date of Patent: Feb. 15, 2022

(54) PROCESS FOR ADAPTABLE HEALTH, DEGRADATION AND ANOMALY DETECTION OF SYSTEMS USING BENCHMARKS

(71) Applicant: Honeywell International Inc., Morris Plains, NJ (US)

(72) Inventors: Vaclav Slimacek, Valasske Mezirici (CZ); Jiri Rojicek, Badeniho (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 155 days.

(21) Appl. No.: 16/432,479

(22) Filed: Jun. 5, 2019

(65) Prior Publication Data
US 2020/0386435 A1    Dec. 10, 2020

(51) Int. Cl.
| | | |
|---|---|---|
| F24F 11/49 | (2018.01) | |
| F24F 11/38 | (2018.01) | |
| F24F 11/52 | (2018.01) | |
| G06N 20/00 | (2019.01) | |

(52) U.S. Cl.
CPC ............. *F24F 11/49* (2018.01); *F24F 11/38* (2018.01); *F24F 11/52* (2018.01); *G06N 20/00* (2019.01)

(58) Field of Classification Search
CPC ........................................................ F24F 11/38
See application file for complete search history.

(56) References Cited

U.S. PATENT DOCUMENTS

| | | | |
|---|---|---|---|
| 9,366,451 B2 | 6/2016 | Guo et al. | |
| 2016/0370799 A1 | 12/2016 | Denton et al. | |
| 2017/0352245 A1* | 12/2017 | Maher | H04L 63/1425 |
| 2018/0299158 A1* | 10/2018 | Ajax | F24F 11/46 |
| 2020/0162354 A1* | 5/2020 | Drees | G06N 5/04 |
| 2020/0380387 A1* | 12/2020 | Pourmohammad | F24F 11/30 |

FOREIGN PATENT DOCUMENTS

WO    2018004464 A1    1/2018

OTHER PUBLICATIONS

Najafi et al., "Application of Machine Learning in Fault Diagnostics of Mechanical Systems," World Congress on Engineering and Computer Science, 7 pages, Oct. 2008.

\* cited by examiner

*Primary Examiner* — Nathan L Laughlin
(74) *Attorney, Agent, or Firm* — Seager, Tufte & Wickhem, LLP

(57) ABSTRACT

An approach for measuring health of a system using benchmarks. The approach may incorporate defining benchmarks with sensors providing data of selected conditions of a system, collecting a predetermined amount of most recent data from the sensors for one or more modes of the system, training a model that represents the system, the model having a response variable that is a function of the predetermined amount of the most recent data from the sensors, applying the model trained, to the benchmarks to get a response of the model in a form of the response variable that is the function of the predetermined amount of the most recent data from the sensors, and comparing the response of the model of the most recent time window with a response of the model of a previous time windows to determine health of the system.

19 Claims, 2 Drawing Sheets

PROCESS FOR ADAPTABLE HEALTH, DEGRADATION AND ANOMALY DETECTION OF SYSTEMS USING BENCHMARKS

BACKGROUND

The present disclosure pertains to systems, and particularly to evaluation and prognoses of systems.

SUMMARY

The disclosure reveals an approach for measuring health of a system using benchmarks. The approach may incorporate defining benchmarks with sensors providing data of selected conditions of a system, collecting a predetermined amount of most recent data from the sensors for one or more modes of the system, training a model that represents the system, the model having a response variable that is a function of the predetermined amount of the most recent data of the most recent time window from the sensors, applying the model trained, to the benchmarks to get a response of the model in a form of the response variable that is the function of the predetermined amount of the most recent data from the sensors, and comparing the response of the model of the most recent time window with a response of the model of previous time windows to determine health of the system. The system may be an electro-mechanical one such as a heating, ventilation and air conditioning mechanism.

DESCRIPTION

Figure 1:
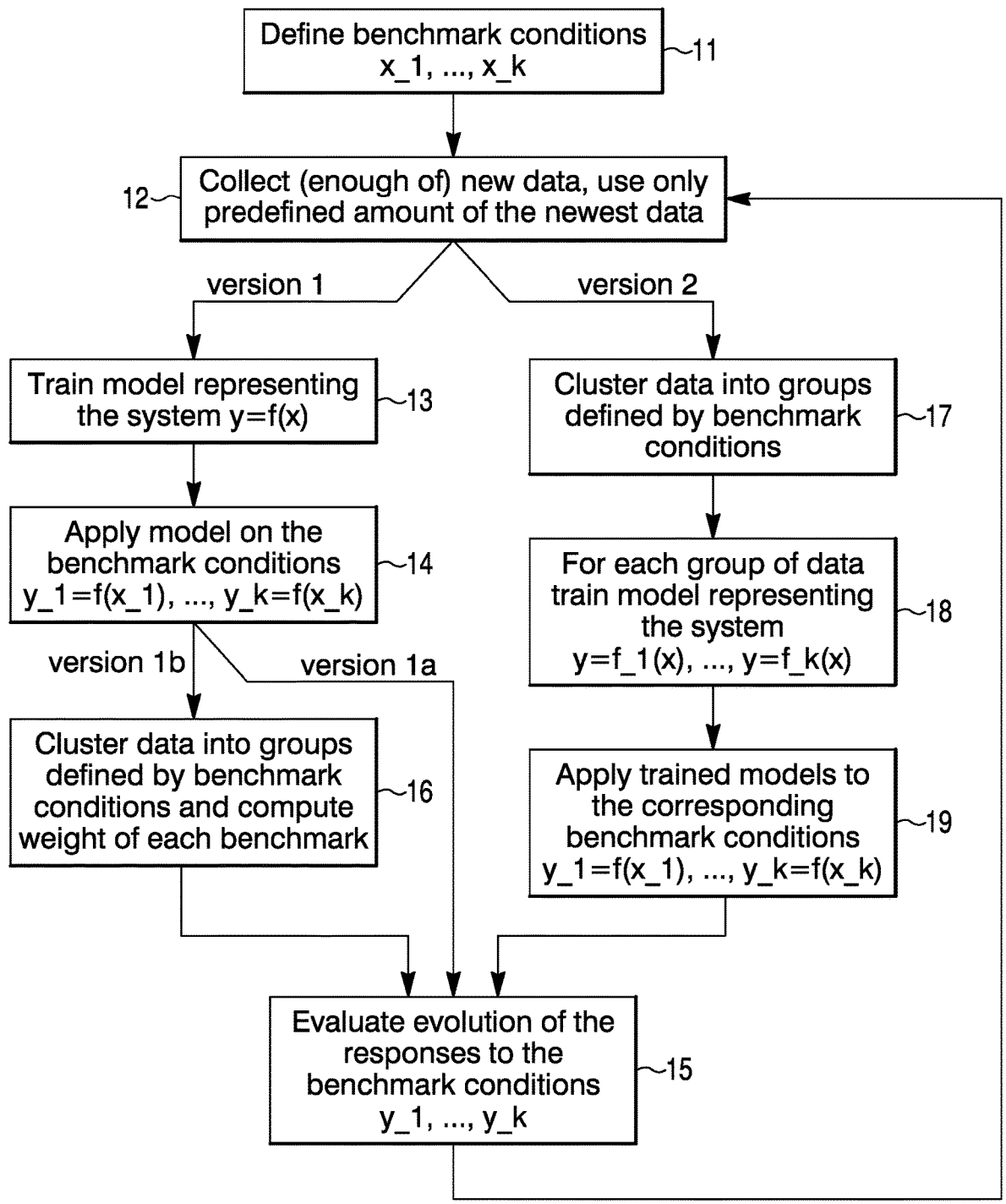
FIG. 1 is a diagram of a process including an algorithm for evaluating systems.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

The system described in the summary has application to many kinds of systems. An example of a specific application, but not an exclusive one, may be an analysis and prediction of degradation of heating, ventilation and air conditioning systems (HVAC) like air handlers, roof top units and others may be necessary for their health and condition monitoring and efficient maintenance optimization. Configuration variability of such equipment and variability of installed sensors may make this task difficult; multiple sensors may be often used to simultaneously monitor internal status of a unit or a system as well as external operational conditions. Signals from sensors may be usually mutually dependent. Their quality may vary and an amount of collected data may be generally increasing which, among others, makes it difficult to use a classical rule-based health system which moreover needs an ontological description of available data. Also, the above mentioned variability makes configuration of any rule based system difficult to set up and maintain.

Described approach is robust against common problems mentioned above including data problems as mixed or misplaced sensors, changing conditions or a cold-start problem (i.e., a lack of initial data).

The present approach may be applied for continuous anomaly detection and prediction of degradation of any complex system described by streams of data from multiple sensors monitoring external and internal conditions of the system for which it is possible to define a (proxy) variable (using the sensor data) representing performance or health of the system.

Machine learning algorithms may be used for modeling and prediction of degradation of mechanical items monitored by multiple sensors. A typical approach may be to collect data at the beginning, define a variable representing performance or health of the system (it can be a proxy variable, for a HVAC system it can, for example, be defined as a difference between the set temperature and the space temperature or any fault likelihood), train a machine learning model predicting the performance of the system which is then continuously applied on current conditions, and the estimated performance is compared with the initial state of the system. This approach may be summarized as "fix model, change conditions". The main challenges with this approach are that it needs a lot of initial training data (training data should cover all possible conditions which a system can experience, i.e., in case of a HVAC system, data from heating as well as from cooling periods), possibly several models for different conditions are necessary and the model does not react to changes in a system-like addition of new sensors.

Subsequently, such machine learning models appear difficult to be trained, deployed and maintained in a standard business environment as these steps require an expert to be involved. The present approach may be an alternative to this workflow by adjusting internal models as the integral part of the process—it may be summarized as "fix conditions, change models". Such approach may significantly lower a deployment barrier and as such create new value for a company.

HVAC equipment is known to be operating in different conditions and modes. It may be safely assumed that typical operating conditions for each HVAC unit can be defined, either with use of previous field engineer expert knowledge or directly estimated from already collected data, for example, with use of clustering methods as cluster centroids (expert knowledge can be, of course, also utilized in the estimation). These typical operating conditions may be called benchmarks for this approach.

As mentioned above, let one assume that there exists a (proxy) variable (using the sensor data) representing performance or health of the system. A machine learning model predicting the performance variable may be then continuously (re)trained over subsets of data corresponding to a sliding time window and applied on the benchmark conditions.

The evolution of the predicted performance or anomaly indicator for every benchmark may be then examined, for example with use of classical control charts methodology. The training data can be classified into groups defined (and represented) by benchmarks, for example, with use of clustering methods. It is important to note that the performance variable should not be part of the classification procedure.

The proportions of time the system spent in individual benchmark groups during the training time window may represent weights which should be considered during evaluation of the predicted performance with respect to given benchmark. Trained models can also be used for predictions of future behavior of the system. Continuous retraining of models representing the system may enable adaptations to an environment unique for given unit and changing conditions (i.e., addition of new sensors, variable quality of data, and so forth) and it is not necessary to collect large amounts of initial data.

A simplified version of the above approach may be to directly cluster data from sliding time windows into pre-defined benchmark groups (again, either defined by an expert, estimated from available data or by combination of an expert knowledge and a data-driven approach and the performance variable should not be used during clustering). After collecting enough observations in a given cluster (for example, a typical amount of data for this cluster during one operation day), the (statistical) distribution of the performance variable connected with these observations may be evaluated. Evolution of distribution of the performance variable may be then examined within each benchmark group.

FIG. 1 is a diagram of an algorithm for the adaptable health, degradation and/or anomaly detection of electro-mechanical systems. In symbol 11, benchmark conditions may be defined. The conditions may be represented as $x\_1, \ldots, x\_k$. Enough new data may be collected. Only a pre-defined amount of the newest data may be used according to symbol 12.

The data from symbol 12 may be dealt with in two ways or versions based on the nature and amount of available data. Either the first or the second version will be used. The first version is based on one model representing the system $y=f(x)$ as noted in symbol 13. The model may be applied on the benchmark conditions noted in symbol 11, to result in $y\_1=f(x\_1), \ldots, y\_k=f(x\_k)$. The result may be used in a version 1a or version 1b. Version 1a may be applied to an output or result from symbol 14. Version 1a may be where an evaluation is made of an evolution of responses to the benchmark conditions $y\_1, \ldots, y\_k$ from symbol 14 according to symbol 15. After symbol 15, a return to symbol 12 may occur for collecting new data again to repeat the approach of version 1. Only one version should be used in the loop.

Version 1b from symbol 14 may be to cluster data into groups defined by benchmark conditions and compute a weight of each benchmark according to symbol 16. From results of symbol 16, there may be an evaluation of the responses to the benchmark conditions $y\_1, \ldots, y\_k$ at symbol 15. A return to symbol 12 may occur for collecting new data again to repeat the approach of version 1.

The second version which may be appropriate in case when nature of the data results in inaccurate model starts at symbol 12. Again, only one version should be used within a loop. In version 2 the predefined amount of the newest data is clustered into groups defined by benchmark conditions according to symbol 17. Then for each group of data, a model or models may be trained representing the system $y=f\_1(x), \ldots, y=f\_k(x)$, at symbol 18. According to symbol 19, trained models may be applied to corresponding benchmark conditions $y\_1=f\_1(x\_1), \ldots, y\_k=f\_k(x\_k)$. At symbol 15, evolution of the responses to the benchmark conditions $y\_1, \ldots, y\_k$ may be evaluated. Then, a return to symbol 12 may occur to repeat the above mentioned process for new data. As noted herein, just one version should be used within a loop.

Figure 2:
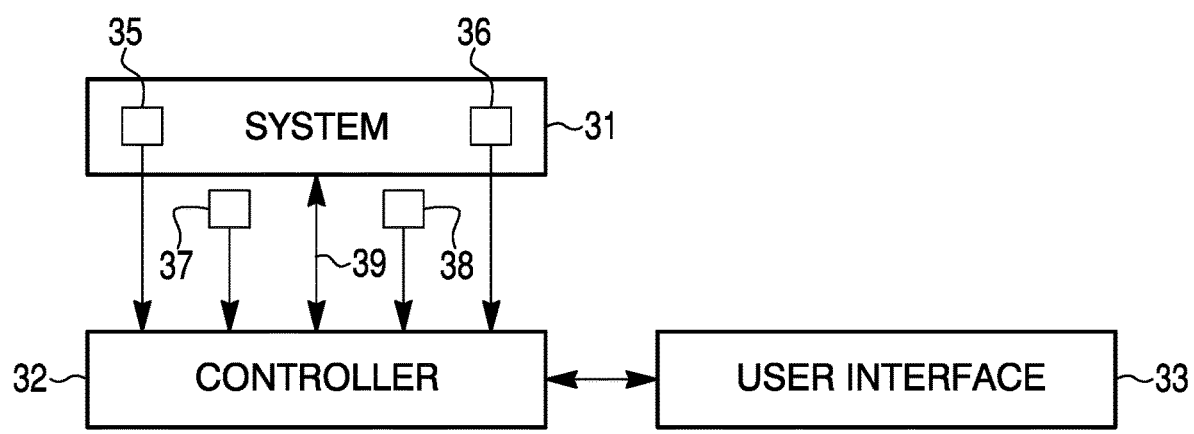
FIG. 2 is a diagram of an electro-mechanical system that may be evaluated for health, degradation and/or anomalies.

FIG. 2 is a diagram of an electro-mechanical system 31 that may be evaluated for health, degradation and/or anomalies. System 31 may be an HVAC system. Internal sensors 35 and 36 may provide data to a select controller 32. External sensors 37 and 38 may also provide data to controller 32. The data may reveal conditions of the system which may be a basis for defining benchmarks of the system. Controller 32 and system 31 may interact via a two-way connection 39. Controller 32 may receive and send information and control signals relative to system 31. Controller 32 may provide calculations and programming for the processing of evaluations of system 31. A user interface 33 may direct programming and processing items for controller 32. Also, user interface 33 may provide one with evaluations of system 31. System 31 may be one of various kinds of mechanical or other systems. An example may be an HVAC for a building.

The present approach may have a software component. A stack level may involve a cloud—secure, scalable infrastructure for collecting, aggregating and storing data, allowing connected "things" to communicate, offering/SaaS solution available, IaaS/PaaS, and data lakes.

A software type may involve connected/connectivity—an offering available thru cloud or direct, remote connection (SaaS) or cover infrastructure enabling connected services (sentience).

There may an IoT. An IoT stack level may involve a cloud—a secure, scalable infrastructure for collecting, aggregating and storing data, allowing connected "things" to communicate, offering/SaaS solution available, IaaS/PaaS, data lakes.

The present system may generate or capture data. The following may be an example which illustrates the idea of the algorithm. One may imagine that one is running regularly and one wants to know whether one is getting better or worse. One may run different distances (distances between 100 m and 10 km, sometimes 120 m, sometimes 1.3 km, and so on) under different conditions (temperature, wind, weather, different shoes, different surfaces, amount of sleep last night, and so on) and the conditions as well as distances may change almost every time so one cannot necessarily compare times of two runs directly. At the same time one does not necessarily have an opportunity to go to a training hall where conditions are almost constant to run some fixed distances to check your performance. The connection to a HVAC or other mechanical system may be that it also operates in dynamic environment where conditions seldom repeat (e.g., one may consider just the changes in weather) and one does not have a possibility to really fix the conditions to do some tests.

In the classical approach to the issue, one may be recording running time under different conditions (e.g., distance, temperature, wind, weather, shoes, surface, sleep, and so forth). After collecting enough data covering all possible combinations conditions, one may create a model of oneself predicting time under different conditions (i.e., time is a function of different conditions, time=f(distance, temperature, wind, weather, shoes, surface, sleep)). One may also create several models, one for example for sprints and another for long distances.

When one is running now, one may plug in the current conditions into the model (or one would first decide which of the models one should use for the current condition in case of multiple models, whether the current situation is closer to sprints or long distance runs), and compare the time estimated by the model with one's actually measured time. If the measured time is lower than predicted, one may be getting better compared to the period during which one was collecting data; otherwise one is getting worse or is at the same level. That means that one may be comparing one's current state with the model of previous oneself (e.g., one may fix a model of oneself, change data which one is feeding into the model).

In a benchmark approach (which is the subject of the patent application), one may first define typical conditions under which one is interested in one's performance, e.g., C1=(100 m, 20° C., no wind, sunny, running shoes, forest path, 8 hours of sleep), C2=(10 000 m, 20° C., no wind, sunny, running shoes, forest path, 8 hours of sleep), and so on. These benchmark conditions may substitute the fixed conditions in a training hall or the most typical conditions for one's running. One may not necessarily specify a running time under these conditions. One may be training/running, collecting data, and after some time, for example, 1 month, one could create a model representing oneself during this month (time=f(distance, temperature, wind, weather, shoes, surface, sleep)). This model may then be applied on the benchmark conditions and one may will get predicted times for individual benchmarks. Comparison with the previous period may tell one whether one is getting better or worse. When one gets new data (for example, after one week), one may train a new model over period of time (one is throwing away the oldest data which are not relevant to your current performance, that is, one is using data only from the current time window, for instance, data from the last 30 days from now). One needs to deal with the fact, that one can have a little data for some benchmarks (one's model must generalize well). Alternatively, one may cluster one's collected data into groups defined by benchmarks and train a different model for each benchmark group. That means that one may be comparing a projection of one's current state on the benchmark conditions with previous performance on the benchmark conditions (fix data which one is feeding into the model (benchmarks), change models of yourself so they represent one's current state). The main benefit of this approach may be, that one does not necessarily have to wait until one collects enough data covering all possible conditions, which can take year(s), but just enough data to train a reliable model representing one's current state. A definition of benchmarks should not be an issue from field experts.

In block 11 of the diagram, there may be examples of benchmark conditions in terms of an HVAC system or a mechanical system that the present system is most often to be applied to, in that block 11 indicates that the conditions be defined.

The benchmark conditions in terms of an HVAC system may be typical conditions, which an HVAC system was designed for, or typical conditions under which an HVAC system is really operating. They may be basically defined by available sensors, which can be different for different HVAC systems. These conditions may be defined by an expert or estimated from already collected data as the most common conditions. HVAC systems may typically operate in two modes, cooling and heating, and usually data about set point temperature, space temperature, fan speed, heating intensity, cooling intensity, outdoor air temperature are collected. Thus, the benchmark conditions may be, for example, C1= (set point temperature=21° C., space temperature=21° C., fan speed=50%, heating intensity=0%, cooling intensity=30%, outdoor air temperature=27° C.) and C2=(set point temperature=21° C., space temperature=21° C., fan speed=50%, heating intensity=30%, cooling intensity=0%, and outdoor air temperature=17° C.).

Block 12 of the diagram is about collecting new data. It is thought that the data may be from certain kinds of sensors. Examples of new data that may be good can be temperature or other parameters of the system of interest here. "Enough" and "predefined amount", or "amount" may be in qualitative and/or quantitative terms.

Examples of sensors used in HVAC systems may be listed in the answer to the previous issue. How much data needs to be collected may depend on an individual system and a concrete machine learning approach used in the algorithm. It may be influenced by the sampling rate of the data, whether the system was actually running or in off or idle state, how much the system and its environment is changing, and so forth. Since data from sliding windows may be used, new sensors can be added or some sensors can be dismounted (benchmark conditions must be adapted to reflect these changes as well). The loop in the diagram represents a time step (move of the sliding window). An amount of data may also be measured by different metrics, including, but not limited to collecting data for predefined amount of time or just predefined amount of data. Considering the running example, one can be training for another week or training until one runs some predefined total distance (5 km in sprints and 50 km in long runs, i.e., if one is using a unique model for each benchmark, they may be updated asynchronously).

Block 13 talks about "train model" that represents the system. A formula such as y=f(x) may be meant that the response variable may be a function of measured data (from sensors)—just a mathematical way to represent relationship in the diagram. Function 'f' may be any machine learning model which maps data from sensors to the response variable (running time is a function of distance and conditions in which you are running). Which machine learning model is suitable may depend on the concrete application and data available.

Block 14 applies the model to the benchmark conditions in the form of a formula as stated. The purpose of this block is to get the response of the model trained in the block 13 to the defined benchmark conditions. That is, in block 13 one trained one model representing one's running performance (using data from the last month, i.e., one's current running performance) and one is checking, what would be one's running time on short distance and long distance under conditions defined in above. In the block 15 one may be comparing this estimated running time with the estimates from the previous time windows.

In block 16, data are clustered into groups defined by the benchmark conditions which are to have been defined in block 11. Each benchmark apparently has a weight that is computed.

Considering the example with running, imagine that during a time window one was running mostly short distances (90%) and only few long distance runs (10%), and that one has two benchmark conditions, one for sprints and one for long runs. One may have one model for both running modes representing oneself. Naturally, the estimations of one's current state may be better for sprints than for long distances because one just has more data for training the model and one can take it into consideration when evaluating one's performance (the uncertainty of the estimation of one's performance for long distance runs is bigger). This may be done using weights which are basically related to the distribution of one's training data. They may be related to the number of points representing individual benchmark groups in training data or time spend in the benchmark groups (like time spend cooling and heating in case of HVAC systems). This also may influence what 'enough' data in block 11 means. One may be collecting data for some predefined amount of time or collecting data until one has a predefined amount of data points in the individual benchmark group.

In block 15, an evaluation of evolution of the responses to the benchmark conditions may be made. One may basically look if the system is getting better or worse compared to the previous time windows. One may want to combine all responses to the benchmarks to one number representing overall health.

Block 17 appears partially similar to the first portion of block 16. The difference may be that in the version 2 (right branch of the diagram) of the algorithm one is training a separate model for each benchmark group (one model for sprints, one for long distance runs), so one first needs to classify one's data. In the version 1 (left branch of the diagram) you may be training only one model which should capture both, the sprints and at the same time long distance runs, and later one may be using clustering and computation of weights for evaluation how good your model is for individual benchmarks.

Block 18 appears similar to block 13 but with a different formula representation of the system. In this version of the algorithm, one is supposed to train an individual model for each benchmark group (one model for sprints, one for long distance runs, or in case of HVAC systems, one model for heating and one model for cooling).

Block 19 appears similar to block 14 but with the latter block pertaining a plurality of groups and models. It may represent that one applies a model for sprint to the benchmark representing sprints and applies the model for long distance runs to the benchmark representing long runs.

To recap, an approach for measuring health of a heating, ventilation and air conditioning system using benchmarks, may incorporate defining benchmarks for a process, with sensors for providing data of specific conditions of a heating, ventilation and air conditioning (HVAC) system, collecting a predetermined amount of most recent data from the sensors for one or more modes of the HVAC system, training a model that represents the HVAC system, the model having a response variable (y) that is a function (f) of the predetermined amount of the most recent data (x) of a most current time window from the sensors, applying the model trained, to the benchmarks to get a response of the model in a form of the response variable (y) that is the function (f) of the predetermined amount of the most recent data (x) from the sensors, and comparing the response of the model of the most current time window with a response of a model of a subsequent time window.

The function (f) may be a machine learning model that maps data (x) from the sensors to the response variable (y).

The approach may further incorporate clustering the data into groups defined by the benchmarks.

A weight of each benchmark may be calculated.

The weight of each benchmark may be calculated according an amount of time spent in benchmark groups.

A process for detecting a condition of a system, may incorporate defining benchmark conditions of the system, collecting a predetermined amount of data related to the benchmark conditions over a time period up to a present time window, training a model to represent the system in response to the data collected, obtaining a response of the model trained relative to the benchmark conditions, and comparing an estimate response at the present time window of the model with an estimated response from a previous time window of the model.

The process may further incorporate clustering data into groups defined by benchmark conditions, and computing a weight of each benchmark condition.

The weight may be proportionally related to distribution of data among the benchmark conditions.

The model may represent the system in that a response variable (y) may be a function (f) of the pre-determined amount of data (x), that is, y=f(x).

An approach for evaluation of mechanical systems may incorporate defining benchmark conditions, collecting data, clustering the data into groups according to the benchmark conditions, training a model for each group representing a system, and applying models that are trained to corresponding benchmark conditions. The benchmark conditions may be defined by one or more sensors of the systems.

The approach may further incorporate comparing present responses with previous responses relative to the benchmark conditions.

Each system may be a HVAC system.

The one or more sensors may be selected from a group having set point temperature sensors, space temperature sensors, fan speed indicators, heating intensity indicators, cooling intensity indicators, outdoor temperature sensors, and humidity sensors.

A weight of each group of benchmark conditions may be calculated proportionally according to amounts of data clustered into a group or according to amounts of time spent in a group.

The HVAC system may incorporate a group of benchmark conditions for cooling and a group of benchmark conditions for heating.

A weight of the group of benchmark conditions for cooling and a weight of the grouping benchmark condition for heating may be proportionally computed relative to the time of cooling by the HVAC system and the time of heating by the HVAC system.

Each system may be an HVAC system. Benchmark conditions may be defined by the one or more sensors of the HVAC systems. Comparing present responses with previous responses relative to the benchmark conditions may indicate whether a particular HVAC system is deteriorating, or whether a particular HVAC system is superior to another HVAC system. Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method for measuring health of a heating, ventilation and air conditioning system using benchmarks, comprising:
defining one or more benchmarks for a Heating, Ventilation and/or Air Conditioning (HVAC) system based on performance data of specific operating conditions of the heating, ventilation and air conditioning (HVAC) system collected by one or more sensors, the specific operating conditions comprising at least one internal operating condition and at least one external operating condition, wherein the at least one external operating condition includes an outdoor air temperature;

collecting a predetermined amount of most recent performance data from the sensors for one or more modes of the HVAC system, wherein the one or modes of the HVAC system comprises one or more of a heating mode and a cooling mode;

training a model that represents the HVAC system, the trained model having a response variable (y) that is a function (f) of the predetermined amount of the performance data (x) collected by one or more of the sensors during a most recent time window;

applying the trained model to the defined one or more benchmarks to get a response of the trained model in a form of the response variable (y) that is the function (f) of the predetermined amount of the performance data (x) collected by one or more of the sensors during the most recent time window; and comparing the response of the trained model corresponding to the most recent time window with a response of a re-trained model corresponding to a subsequent time window.

2. The method of claim 1, wherein the function (f) is a machine learning model that maps the performance data (x) collected by one or more of the sensors to the response variable (y).

3. The method of claim 1, further comprising clustering the performance data into groups defined by the benchmarks.

4. The method of claim 3, wherein a weight of each benchmark is calculated.

5. The method of claim 4, wherein the weight of each benchmark is calculated according an amount of time spent in benchmark groups and/or an amount of performance data collected for each benchmark group.

6. A process for detecting a condition of a system, comprising:
defining one or more benchmark conditions of a system, each of the one or more benchmark conditions corresponding to a corresponding set of operating conditions of the system;
collecting a defined set of data covering the set of operating conditions that correspond to the one or more defined benchmark conditions;
training a model to represent the operation of the system using the defined set of data;
applying the trained model on the one or more benchmark conditions to obtain a response of the trained model under the one or more benchmark conditions;
repeating the collecting, training and applying steps; and evaluate an evolution of the response of the trained model under the one or more benchmark conditions.

7. The process of claim 6, further comprising clustering the collected data into groups defined by the one or more benchmark conditions.

8. The process of claim 7, further comprising computing a weight of each benchmark condition.

9. The process of claim 8, wherein the weight is proportionally related to distribution of data among the benchmark conditions.

10. the process of claim 6, wherein the model represents the system in that a response variable (y) is a function (f) of the collected data (x), that is, y=f(x).

11. An approach for evaluation of mechanical systems comprising:
defining benchmark conditions;
collecting data;
clustering the data into groups according to the benchmark conditions;
training a model for each group representing a system; and
applying models that are trained, to corresponding benchmark conditions;
wherein a weight of each group of benchmark conditions is calculated proportionally according to amounts of data clustered into a group or according to amounts of time spent in a group.

12. The approach of claim 11, wherein the benchmark conditions are defined by one or more sensors of the systems.

13. The approach of claim 12, further comprising comparing present responses with previous responses relative to the benchmark conditions.

14. The approach of claim 13, wherein each system is a HVAC system.

15. The approach of claim 14, wherein the one or more sensors are selected from a group comprising set point temperature sensors, space temperature sensors, fan speed indicators, heating intensity indicators, cooling intensity indicators, outdoor temperature sensors, and humidity sensors.

16. The approach of claim 11, wherein the HVAC system comprises a group of benchmark conditions for cooling and a group of benchmark conditions for heating.

17. The approach of claim 16, wherein a weight of the group of benchmark conditions for cooling and a weight of the grouping benchmark condition for heating are proportionally computed relative to the time of cooling by the HVAC system and the time of heating by the HVAC system.

18. The approach of claim 13, wherein:
each system is an HVAC system; and
benchmark conditions are defined by the one or more sensors of the HVAC systems.

19. The approach of claim 18, wherein comparing present responses with previous responses relative to the benchmark conditions indicates whether a particular HVAC system is deteriorating, or whether a particular HVAC system is superior to another HVAC system.

* * * * *